United States Patent [19]

Terzian et al.

[11] 4,005,764
[45] Feb. 1, 1977

[54] GOVERNOR MEANS FOR TOY AND GAME MOTORS OR THE LIKE

[75] Inventors: Rouben T. Terzian, Chicago; Eckehard Friederich, Niles; Howard J. Morrison, Deerfield, all of Ill.

[73] Assignee: Marvin Glass & Associates, Chicago, Ill.

[22] Filed: Aug. 19, 1974

[21] Appl. No.: 498,577

Related U.S. Application Data

[63] Continuation of Ser. No. 292,137, Sept. 25, 1972, abandoned.

[52] U.S. Cl. ............................... 185/37; 185/DIG. 1
[51] Int. Cl.² .......................................... F03G 1/00
[58] Field of Search ................. 185/37, 39, DIG. 1; 192/58 A, 60; 200/33 R, 33 A, 33 B, 34; 73/430, 522

[56] References Cited

UNITED STATES PATENTS

| 3,118,027 | 1/1964 | Boyles | 200/34 |
| 3,712,421 | 1/1973 | Hadfield | 185/37 |

Primary Examiner—Samuel Scott
Assistant Examiner—Lance W. Chandler
Attorney, Agent, or Firm—Coffee and Sweeney

[57] ABSTRACT

In a spring or electric motor, or other power means for toys, games or the like, a liquid governor which has gear members disposed for rotation within a closed interior cavity of a housing for the governor. A driven shaft extends from the motor means through the housing into the cavity and is operatively connected to a driven gear disposed within the cavity. An idler gear is disposed in meshed engagement with the driven gear for rotation thereby, and a high viscosity liquid substantially fills the cavity providing resistance to the driving of the gears and thereby a slowing control for the motor.

6 Claims, 5 Drawing Figures

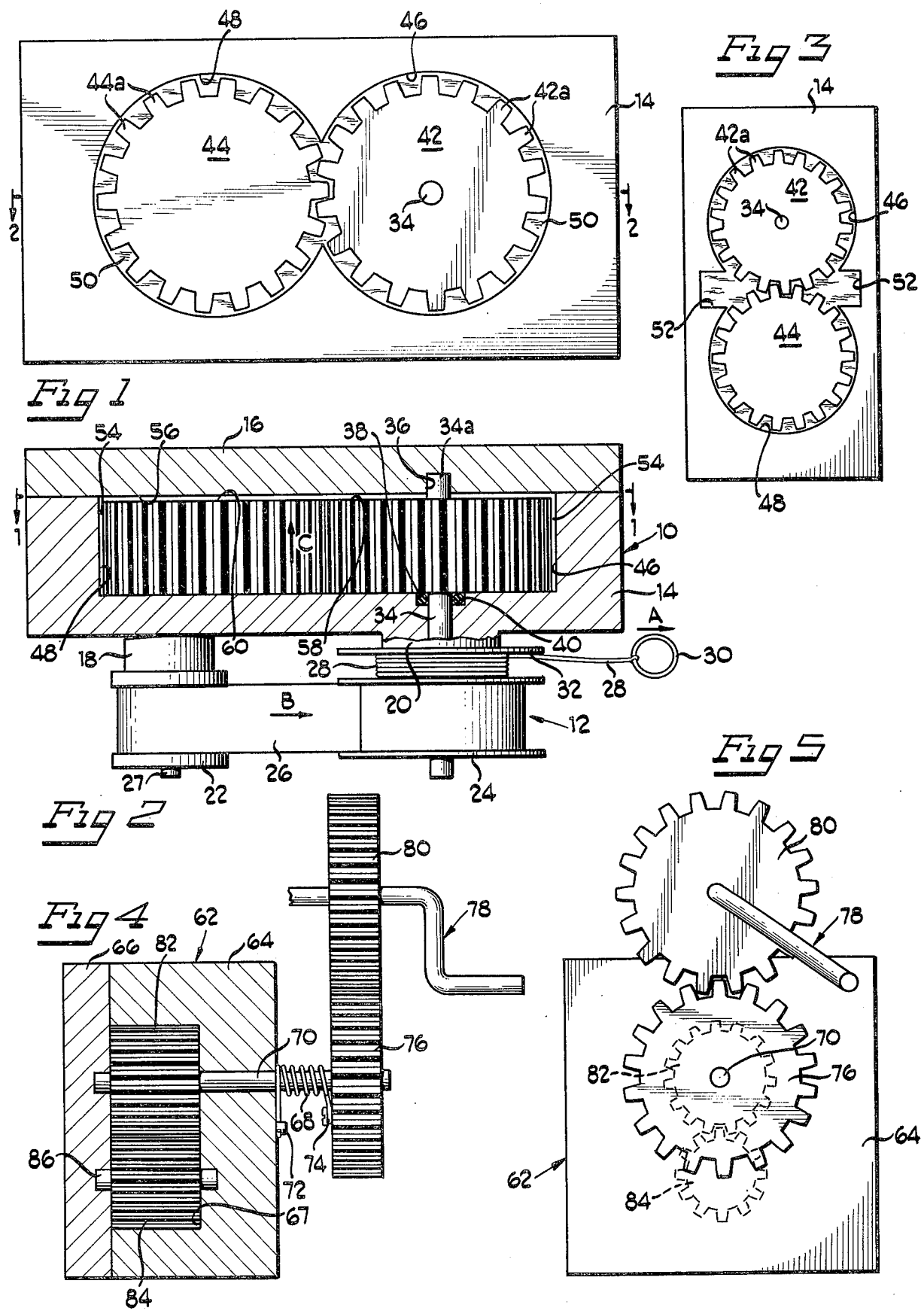

4,005,764

GOVERNOR MEANS FOR TOY AND GAME MOTORS OR THE LIKE

CROSS REFERENCE TO OTHER APPLICATIONS

This is a continuation of application Ser. No. 292,137, filed Sept. 25, 1972, now abandoned.

BACKGROUND AND SUMMARY OF THE INVENTION

This invention relates to motors and governor means therefor, for use in toys, games and the like.

Miniature motor means, such as spring motors, electric motors, and the like, have become widely used in innumerable varieties of toys and games, such as dolls or the like. Such motive or power means in many instances use governors, such as of the flywheel type, starwheel and oscillating crank type, and the like. Such governors require a gear train, particularly when using a spring motor, to step up the speed of the motor considerably so that a relatively small starwheel, flywheel, or the like may be utilized to control the spring. Not only do these gear trains require considerable space within the toy or game, but the noise associated with their operation is annoying and may wel detract from the entire affect which is desired from the toy. For instance, with dolls that have eyes and heads and other appendages which are actuated, the grinding of gears is undesirable. Noise from the gears would completely detract from toys and games wherein a "ghost affect" would be desirable. There is a definite need for a quiet smooth running governor for use with miniature motors (i.e., in toys, games and the like) to solve these problems. Further, thre is a constant need for improved governor devices in wide varieties of games having moving components.

An object, therefore, of the present invention is to provide a new and improved governor means for use with motors in toys, games or the like.

In the exemplary embodiments of the invention, spring motors are shown in conjunction with the governor means. However, it is contemplated that other miniature motors, such as electrical motors, are equally adaptable for use with the governor means of the present invention.

As shown herein, the govenor means includes a housing having a closed, preferably sealed, interior cavity. A driven shaft from the motor extends through the housing and into the cavity and is operatively connected to a circular disc shaped driven gear member is disposed within the cavity in mesh with the driven gear member but otherwise is freely rotatable within the cavity under the restraint of a high viscosity liquid substantially surrounding the gear members. The liquid provides resistance to the driving of the gear members by the motor means, thus slowly the motor and providing a more uniform speed of operation. (The use of the term "disc" gear herein is not intended to in any way limit the gear means to any particular thickness of the gears. Disc gear is only meant to connote a gear member having an annular or circular set of gears.)

When using the aformentioned two disc gears, the driven gear and the idler gear, the cavity within which they are disposed is comprised of a pair of cylindrical portions concentric with and surrounding the disc gears. The cavity portions join each other in the area of the meshed teeth of the gears. The end walls of the cylindrical portions are generally planar and adjacent the side planar faces of the gears. In one form of the invention shown herein, the distance between the cylindrical walls of the cylindrical cavity portions and the adjacent peripheral extremities of the gear teeth on the respective gears is less than the distance between the cavity end walls and the side faces of the gears. This causes some volume of the high viscosity liquid to be forced transversely of the gears (i.e., generally parallel to their axes of rotation) rather than moving the liquid in a circular pattern with the rotating teeth about the interior cavity walls.

In another form of the invention, enlarged cavity portions are formed in the area where the cylindrical cavity portions join, adjacent the meshed area of the teeth of the disc gears. Such arrangements tend to decrease the resitance of the liquid on the rotating movement of the gears.

Other objects, features and advantages of the invention will be apparent from the following detailed description taken in connection with the accompanying drawings.

DESCRIPTION OF THE DRAWINGS

FIG. 1 is a plan view taken generally in the direction of line 1—1 in FIG. 2, with the housing cap removed to show the interior cavity and gears of one form of governor means in accordance with the present invention;

FIG. 2 is a vertical section taken generally along the line 2—2 of FIG. 1, with the housing cap in position closing the interior cavity for the gears;

FIG. 3 is a view similar to that of FIG. 1, on a reduced scale, of a modified form of the invention;

FIG. 4 is a sectional view through another form of governor means of the present invention; and FIG. 5 is an elevational view of the structure shown in FIG. 4, as looking toward the left (as viewed in the drawings) at the righthand side of FIG. 4.

DETAILED DESCRIPTION OF THE INVENTION

Refering to the drawings in greater detail, and first to FIGS. 1 and 2, the operative components of the governor means of the present invention are disposed within a housing, generally designated 10, on which is mounted a negator spring motor, generally designated 12. While spring motors are shown in the drawings, it is to be understood that the governor means of the present invention is readily adaptable for use with other motors, such as electrical motors, of the miniature type used in toys, games and the like, as well as a wide variety of other similar power or motive means.

The housing 10 for the operative components of the governor means includes a body portion 14 and a cap portion 16 which are secured together to define an interior closed cavity (to be described in greater detail hereinafter.) The cap portion 14 of the housing 10 may be removably mounted onto the body portion 14, as by threading or the like, to permit removability thereof and across to the interior cavity of the housing. In the alternative, the cap portion 16 may be permanently secured to the body portion 14 of the housing, as shown in FIG. 1, as by adhesives, heat sealing or the like.

The body portion 14 of the housing 10 includes a pair of bosses 18 and 20 on which are mounted a pair of spools 22 and 24. respectively, of the spring motor 12. A negator spring 26 is wrapped about the spools 22 and 24. Spool 22 is a takeup or storing spool for the spring 26 and is rotatably mounted on boss 18 by a shaft 27. Spool 24 is a cocking spool onto which the spring is wound to cock the same and store energy therein. A pull spring 28, having a manually graspable ring 30 on the end thereof, is wrapped about another spool 32 which is pivotally mounted on the boss 20 but fixed for rotation with spool 24. A driven shaft member 34 is secured to the spools 24 and 32 for rotation therewith. The driven shaft 34 extends through the boss 20 and the body portion 14 of the housing and has its inner and 34a received in a recess 36 on the inside of the housing cap portion 16. A ring seal 38 is disposed about the shaft member 34, within an annular reccess 40, to prevent liquid (described hereinafter) from seeping along the shaft member 34 to the outside of the housing.

Thus, it is apparent that a user of the device pulling on the string 28 in the direction of arrow A will cause the negator spring 26 to be moved off of the takeup or storing spool 22, in the direction of arrow B, and onto the cocking spool 24. When the pull string 28 is released, the spring 26, under the force of energy stored therein, tends to return rapidly onto the takeup spool 22.

In order to slow down the return action of the spring motor, the operative components of the governor means of the present invention (as seen in FIGS. 1 and 2) include a driven circular disc gear 42 having gear teeth 42a and an idler disc gear 44 having gear teeth 44a. The disc gears 42 and 44 are disposed in meshed engagement with each other and held in position by a pair of cylindrical cavity portions 46 and 48 for the gears 42 and 44, respectively. Gear 42 is fixed to the driven shaft 34 for rotation thereby under the force of spring 26. Idler gear 44 is freely mounted within its cylindrical cavity portion 48 but held thereby in mesh with gear 42, as shown in FIG. 1.

The closed interior cavity of the housing 10, as defined by the cylindrical cavity portions 46 and 48, is substantially entirely filled by a high viscosity liquid 50 which surrounds the gear members 42 and 44 and is disposed between the teeth thereof. As the negator spring 26 is wound onto the spool 24 and released, whereupon it seeks to return rapidly onto the takeup spool 22, the high viscosity liquid within the cylindrical cavity portions 46 and 48 resists rotation of the gears 42 and 44 which are operatively connected to the driven shaft member 34. With the shaft member 34 secured for rotation with the spool 24, the return action of the spring 26, in turn, will be resisted and slowed depending upon the parameters of the gears 42 and 44, the liquid 50, and the size and configuration of the cavity within which the gears are disposed.

One type of liquid which has been used successfully in the devices of the present invention is the well known oil additive marketed under the trademark STP.

Regarding various of the parameters of the governor, the lower the viscosity of the liquid 50, the lesser will be the resistance on the gear teeth; and thus the speed of the motor will be higher. The size of the cavity in relation to the size of the gears 42 and 44 also will vary the speed of the motor; the larger the cavity above the size of the gears, the less will be the resistance of the liquid of any given viscosity.

Referring to FIG. 3 where like numerals have been applied where applicable, rather than increasing the diameter of the cylindrical cavity portions 46 and 48, enlarged cavity portions 52 may be formed where the cylindrical cavity portions 46 and 48 join adjacent the area of meshed engagement between the gears 42 and 44. These enlargements 52 provide a "liquid pool" which facilitates easier displacement of the liquid and thus less resistance on the gear teeth of the gears 42 and 44. By using such enlargements, the cylindrical portion 48, particularly, would not have to be enlarged to speed up the motor. This is desirable since gear 44 actually is held in meshed position by cavity portion 48.

The size of the teeth on the gears versus the size of the recesses between the gear teeth also can be varied to change the resistance on the motor.

It also is contemplated that an enlarged cavity having one or more planetary gears may be employed, the cavity containing the viscous liquid.

Referring specifically to FIG. 2, it can be seen that the distance between the cylindrical walls of the cylindrical cavity portions 46 and 48 and the outer peripheral extremities of the gear teeth on the adjacent gears 42 and 44, respectively, (as at 54) is less than the distance between the end walls 56 of the cylindrical cavity portions 46 and 48 and the adjacent side faces 58 and 60 of the gear members 42 and 44, respectively. With such a spacing, the liquid has a tendency to move transversely of the gears 42 and 44 (i.e., generally parallel to the axes of rotation of the gears) rather than move with the gear teeth circularly about the interior walls of the cylindrical cavity portions 46 and 48. Such a spacing has shown in practice to provide a smooth running governor.

FIGS. 4 and 5 show an alternate form of the invention wherein a housing, generally designated 62, has a body portion 64 and a cap portion 66 similar to the housing 10 in FIGS. 1 and 2, forming a closed interior cavity 67 which is filled with the governor liquid. In this embodiment, a coil spring 68 is wrapped about a driven shaft member 70, with one end 72 of the spring anchored to the housing body portion 64 and the other end 74 of the spring anchored to a gear member 76 fixed to the shaft member 70. A crank arm, generally designated 78, is fixed for rotation with a second gear member 80 in mesh with gear member 76, whereby the coil spring 68 can be cocked to store energy therein by rotating the crank arm 78. The governor means includes a driven disc gear 82 mounted on and for rotation with the shaft member 70. An idler disc gear 84 is in mesh with gear 82 and has stub shaft portions 86 journalled in the housing body and cap portion 64 and 66, respectively. In this form of the invention, the idler gear 84 has a lesser diameter than the driven gear 82 whereby lesser resistance is exerted on the governor and thus the spring 68.

The foregoing detailed description has been given for clearness of understanding only and no unnecessary limitations should be understood therefrom as some modifications will be obvious to those skilled in the art.

We claim:

1. Governor means for use in toys, games and the like having a frame structure, for operative connection to a motor means of the toy or game to control the operating speed of the motor means, comprising: a housing immovably fixedly positioned on the frame structure and having a closed interior cavity, a driven shaft rotatably mounted on said housing and extending from said motor means through said housing into said cavity, a first circular disc gear disposed in said cavity and drivingly connected to said shaft so as to be rotatably driven thereby, a second circular idler disc gear freely rotatable within said cavity and in mesh with said first disc gear for rotation thereby about an axis generally parallel and in fixed positional relation to the axis of rotation of the first disc gear and the housing, said cavity being comprised of a cylindrical portion concentric with and surrounding each of said disc gears, the cylindrical portions joining each other in the meshed area of said disc gears, the cylindrical walls of each of said cavity portions being spaced from the adjacent peripheral extremities of the teeth on the respective disc gear a sufficient distance to provide liquid passage means therebetween, and a relatively high viscosity liquid substantially filling said cavity and substantially surrounding said disc gears including filling said passage means to provide resistance to the driving of said disc gears.

2. The governor means of claim 1 including means mounting said motor means directly onto said housing.

3. The governor means of claim 1 wherein each of said cylindrical cavity portions has end walls adjacent side faces of its respectively enclosed disc gear, and wherein the distance between the cylindrical walls of each of said cavity portions and the adjacent peripheral extremities of the teeth on the respective gear is less than the distance between the cavity end walls and the side faces of the gears on at least one side of the gears.

4. The governor means of claim 1 wherein said cavity has at least one enlarged cavity portion in the area where said cylindrical portions join adjacent the meshed area of said disc gears.

5. The governor means of claim 4 wherein said enlarged cavity extends substantially the entire width of the meshed teeth of said disc gears.

6. The governor means of claim 1 including a spring motor mounted on said housing and having a main power spring operatively connected to said driven shaft.

* * * * *

UNITED STATES PATENT AND TRADEMARK OFFICE
CERTIFICATE OF CORRECTION

PATENT NO. : 4,005,764
DATED : February 1   1977
INVENTOR(S) : Rouben T. Terzian et al It is certified that error appears in the above-identified patent and that said Letters Patent are hereby corrected as shown below:

Col 1, line 25, "wel" should be --well--.

Col 1, line 50, after "member" insert --. A disc-shaped idler gear member--.

Col 2, line 15, "arrangements" should be --enlargements--.

Col 3, line 11, "reccess" should be --recess--.

Signed and Sealed this

Third Day of May 1977

[SEAL]

Attest:

RUTH C. MASON
*Attesting Officer*

C. MARSHALL DANN
*Commissioner of Patents and Trademarks*